United States Patent Office 3,359,347
Patented Dec. 19, 1967

3,359,347
ADDITION REACTION PRODUCTS OF OXYALKYL-ENATED PHOSPHORUS COMPOUNDS AND N-CONTAINING POLYMERS
Henryk A. Cyba, Evanston, Ill., assignor to Universal Oil Products Company, Des Plaines, Ill., a corporation of Delaware
No Drawing. Filed Dec. 12, 1963, Ser. No. 330,006
11 Claims. (Cl. 260—925)

This application relates to a novel composition of matter comprising the addition reaction product of oxyalkylenated hydroxyhydrocarbon phosphate or oxyalkylenated hydroxyhydrocarbon thiophosphate and polymeric reaction product containing basic nitrogen, and to the use thereof.

As will be set forth in detail hereinafter, the addition reaction products of the present invention are especially useful as additives to organic substances and particularly lubricating compositions comprising a major proportion of an oil of lubricating viscosity. With the increased technology in the art of lubrication, there is an ever increasing need for lubricants which will withstand the increasing severity requirements of such oils. While improved lubricants have been developed, it still is necessary to further improve these lubricants and this is accomplished by incorporating one or more additives into the lubricant. The novel addition reaction product of the present invention serves to improve the lubricants in a number of ways including one or more of extreme pressure (E.P.) additive, oxidation inhibitor, rust and/or corrosion inhibitor, antiwear agent, viscosity index improver, pour point depressant, etc., and, in addition, serves as a detergent and dispersant. The oxyalkylenated hydroxyhydrocarbon phosphate or thiophosphate and the polymeric condensation product containing basic nitrogen are provided as a unitary product in which the various components, apparently due to close physical and chemical association, co-act to produce an additive of improved properties.

In one embodiment the present invention relates to the addition reaction product of an oxyalkylenated hydroxyhydrocarbon compound selected from the group consisting of oxyalkylenated hydroxyhydrocarbon phosphate and oxyalkylenated hydroxyhydrocarbon thiophosphate and polymeric reaction product containing basic nitrogen.

In another embodiment the present invention relates to the use of the addition reaction product as an additive in organic substances including hydrocarbon oils and particularly lubricants.

As an essential feature of the present invention, an oxyalkylenated hydroxyhydrocarbon phosphate or oxyalkylenated hydroxyhydrocarbon thiophosphate is used in preparing the addition reaction product. In general, the di-(oxyalkylenated hydroxyhydrocarbon)-phosphate or dithiophosphate is preferred, although the corresponding mono-oxyalkylenated hydroxyhydrocarbon phosphate or dithiophosphate may be used.

In a preferred embodiment, the oxyalkylenated hydroxyhydrocarbon phosphate is di-(oxyalkylenated alkylphenol)-phosphate including oxyalkylenated alkylphenol phosphate and oxyalkylenated polyalkylphenol phosphate. While the alkyl group or groups each may contain from one to five carbon atoms, in a preferred embodiment the alkyl group or groups contain from six to twenty or more carbon atoms each. Also, the oxyalkylene group preferably comprises oxyethylene or oxypropylene, although it may comprise an oxy group containing from four to eight or more carbon atoms. The number of oxyalkylene groups preferably ranges from one to fifteen per each alkylphenyl group although, when desired, it may range up to thirty or more oxyalkylene groups. When used in the present specification and claims, it is understood that the number of oxyalkylene groups means the number per each alkylphenyl or long chain alkyl group. The following oxyalkylenated alkylphenol phosphates are illustrative. In the interest of brevity, the specific compounds will be described as the oxyethylenated derivatives, with the understanding that the corresponding compounds in which the oxyethylene group contains a larger number of carbon atoms are included within the present invention. The preferred oxyethylenated derivatives include di-(oxyethylenated hexylphenol) - phosphate containing from one to fifteen oxyethylene groups, di-(oxyethylenated dihexylphenol)-phosphate containing from one to fifteen oxyethylene groups, di-(oxyethylenated heptylphenol)-phosphate containing from one to fifteen oxyethylene groups, di-(oxyethylenated diheptylphenol)-phosphate containing from one to fifteen oxyethylene groups, di-(oxyethylenated octylphenol)-phosphate containing from one to fifteen oxyethylene groups, di-(oxyethylenated dioctylphenol)-phosphate containing from one to fifteen oxyethylene groups, di-(oxyethylenated nonylphenol)-dithiophosphate containing from one to fifteen oxyethylene groups, di-(oxyethylenated dinonylphenol)-phosphate containing from one to fifteen oxyethylene groups, di-(oxyethylenated decylphenol)-phosphate containing from one to fifteen oxyethylene groups, di-(oxyethylenated didecylphenol)-phosphate containing from one to fifteen oxyethylene groups, di-(oxyethylenated undecylphenol)-phosphate containing from one to fifteen oxyethylene groups, di-(oxyethylenated diundecylphenol)-phosphate containing from one to fifteen oxyethylene groups, di-(oxyethylenated dodecylphenol)-phosphate containing from one to fifteen oxyethylene groups, di-(oxyethylenated didodecylphenol)-phosphate containing from one to fifteen oxyethylene groups, etc. It is understood that the corresponding mono-oxyalkylenated alkylphenol phosphates may be used.

Preferred oxyalkylenated alkylphenol thiophosphates include the following. Here again, only the oxyethylene derivatives are specifically set forth in the interest of brevity. These preferred dithiophosphates include di-(oxyethylenated hexylphenol) - dithiophosphate containing from one to fifteen oxyethylene groups, di-(oxyethylenated dihexylphenol)-dithiophosphate containing from one to fifteen oxyethylene groups, di-(oxyethylenated heptylphenol)-dithiophosphate containing from one to fifteen oxyethylene groups, di-(oxyethylenated diheptylphenol)-dithiophosphate containing from one to fifteen oxyethylene groups, di-(oxyethylenated octylphenol)-dithiophosphate containing from one to fifteen oxyethylene groups, di-(oxyethylenated dioctylphenol)-dithiophosphate containing from one to fifteen oxyethylene groups, di-(oxyethylenated nonylphenol) - dithiophosphate containing from one to fifteen oxyethylene groups, di-(oxyethylenated dinonylphenol)-dithiophosphate containing from one to fifteen oxyethylene groups, di-(oxyethylenated decylphenol)-dithiophosphate containing from one to fifteen oxyethylene groups, di-(oxyethylenated didecylphenol)-dithiophosphate containing from one to fifteen oxyethylene groups, di-(oxyethylenated undecylphenol)-dithiophosphate containing from one to fifteen oxyethylene groups, di-(oxyethylenated diundecylphenol)-dithiophosphate containing from one to fifteen oxyethylene groups, di-(oxyethylenated dodecylphenol)-dithiophosphate containing from one to fifteen oxyethylene groups, di-(oxyethylenated didodecylphenol)-dithiophosphate containing from one to fifteen oxyethylene groups, etc. It is understood that the corresponding mono-oxyalkylenated alkylphenol dithiophosphates or the corresponding oxyalkylenated alkylphenol monothiophosphates may be used.

In another embodiment the oxyalkylenated hydroxyhydrocarbon phosphate comprises an oxyalkylenated aliphatic alcohol phosphate, the aliphatic alcohol being of long chain and preferably containing at least six and up to fifty carbon atoms. Preferred oxyalkylenated alkanol phosphates in this embodiment include the following. Here again, in the interest of brevity, only the oxyethylene derivatives are specifically recited with the understanding that the corresponding oxyalkylenated derivatives containing from three to eight or more carbon atoms in the oxyalkylene group may be used. The preferred oxyethylene derivatives in this embodiment are di-(oxyethylenated hexanol)-phosphate containing from one to fifteen oxyethylene groups, di-(oxyethylenated heptanol)-phosphate containing from one to fifteen oxyethylene groups, di-(oxyethylenated octanol)-phosphate containing from one to fifteen oxyethylene groups, di-(oxyethylenated nonanol)-phosphate containing from one to fifteen oxyethylene groups, di-(oxyethylenated decanol)-phosphate containing from one to fifteen oxyethylene groups, di-(oxyethylenated undecanol)-phosphate containing from one to fifteen oxyethylene groups, di-(oxyethylenated dodecanol)-phosphate containing from one to fifteen oxyethylene groups, di-(oxyethylenated tridecanol)-phosphate containing from one to fifteen oxyethylene groups, di-(oxyethylenated tetradecanol)-phosphate containing from one to fifteen oxyethylene groups, di-(oxyethylenated pentadecanol)-phosphate containing from one to fifteen oxyethylene groups, di-(oxyethylenated hexadecanol)-phosphate containing from one to fifteen oxyethylene group, di-(oxyethylenated heptadecanol)-phosphate containing from one to fifteen oxyethylene groups, di-(oxyethylenated octadecanol)-phosphate containing from one to fifteen oxyethylene groups, di-(oxyethylenated nonadecanol)-phosphate containing from one to fifteen oxyethylene groups, di-(oxyethylenated eicosanol)-phosphate containing from one to fifteen oxyethylene groups, etc. Here again, it is understood that the corresponding mono-(oxyalkylenated alkanol)-phosphate may be used.

Illustrative preferred oxyalkylenated alkanol thiophosphates include the following. Here again, only the oxyethylenated derivatives are set forth with the understanding that the corresponding derivatives in which the oxyalkylene group contains from three to eight or more carbon atoms may be used. The preferred thiophosphates in this embodiment include di-(oxyethylenated hexanol)-dithiophosphate containing from one to fifteen oxyethylene groups, di-(oxyethylenated heptanol)-dithiophosphate containing from one to fifteen oxyethylene groups, di-(oxyethylenated octanol)-dithiophosphate containing from one to fifteen oxyethylene groups, di-(oxyethylenated nonanol)-dithiophosphate containing from one to fifteen oxyethylene groups, di-(oxyethylenated decanol)-dithiophosphate containing from one to fifteen oxyethylene groups, di-(oxyethylenated undecanol)-dithiophosphate containing from one to fifteen oxyethylene groups, di-(oxyethylenated dodecanol)-dithiophosphate containing from one to fifteen oxyethylene groups, di-(oxyethylenated tridecanol)-dithiophosphate containing from one to fifteen oxyethylene groups, di-(oxyethylenated tetradecanol)-dithiophosphate containing from one to fifteen oxyethylene groups, di-(oxyethylenated pentadecanol)-dithiophosphate containing from one to fifteen oxyethylene groups, di-(oxyethylenated hexadecanol)-dithiophosphate containing from one to fifteen oxyethylene groups, di-(oxyethylenated heptadecanol)-dithiophosphate containing from one to fifteen oxyethylene groups, di-(oxyethylenated octadecanol)-dithiophosphate containing from one to fifteen oxyethylene groups, di-(oxyethylenated nonadecanol)-dithiophosphate containing from one to fifteen oxyethylene groups, di-(oxyethylenated eicosanol)-dithiophosphate containing from one to fifteen oxyethylene groups, etc. It is understood that the corresponding mono-oxyalkylenated alkanol dithiophosphate or the corresponding oxyalkylenated alkanol monothiophosphate may be used.

The oxyalkylenated phenol phosphate or oxyalkylenated alkanol phosphate is prepared in any suitable manner. In a preferred embodiment the alkylphenol or alkanol is first oxyalkylenated and then is converted to the phosphate or thiophosphate. Oxyalkylenation of the alkylphenol or alkanol is effected in any suitable manner. In one method this is accomplished by reacting the phenol or alkanol with the alkylene oxide, particularly ethylene oxide, in the molar ratios to produce the oxyalkylenated phenol or alkanol containing the oxyalkylenated group in the desired proportion. The oxyalklenation generally is conducted at a temperature of from about room temperature to about 350° F. and more particularly from about room temperature to about 200° to about 300° F. When polyoxyalkylenation is desired, the reaction is effected in the presence of a catalyst such as potassium hydroxide, sodium hydroxide, tertiary amine, quaternary hydroxide, etc. When the oxyalkylenation is to be limited to the addition of one oxy group, the catalyst is used with the alkanols but may be omitted with the alkylphenols. Superatmospheric pressure may be employed which may range from about 10 to 1000 pounds or more.

The oxyalklenated aromatic or aliphatic alcohol then is reacted in any suitable manner with $P_2O_5$ to form the desired phosphate or with $P_2S_5$ to form the desired thiophosphate. In preparing the phosphate, one molar proportion of $P_2O_5$ or other suitable phosphorus oxide is reacted per one or two molar proportions of the oxyalkylenated hydroxyhydrocarbon. In general, an excess of $P_2O_5$ is employed in order to insure complete reaction. The reaction is effected at a temperature within the range of from about room temperature to about 230° F. and under substantially anhydrous conditions. The resultant free acid form of the phosphate generally is recovered as a viscous liquid.

When the dithiophosphate is prepared, the oxyalkylenated hydroxyhydrocarbon is reacted in any suitable manner with phosphorus pentasulfide or other suitable phosphorus sulfide to form the desired thiophosphate. At the present time there are different schools of thought as to the structure of phosphorus pentasulfide. It is believed to be $P_2S_5$, but also has been expressed as $P_4S_{10}$. Various structures have been proposed including a polymeric cage-like configuration. Regardless of the exact structure of this compound, phosphorus pentasulfide is available commercially and is used for reaction with the oxyalkylenated hydroxy-hydrocarbon in the manner herein set forth. In the interest of simplicity, phosphorus pentasulfide is also referred to in the present specification as $P_2S_5$, with the understanding that this is intended to cover the phosphorus pentasulfide available commercially or prepared in any suitable manner. The di-(oxyalklenated hydroxyhydrocarbon)-dithiophosphate is prepared by the reaction of four mole proportions of the oxyalkylenated hydroxyhydrocarbon with one mole proportion of $P_2S_5$. Generally, an excess of $P_2S_5$ is used in order to insure complete reaction, which excess usually will not be above about 25% by weight of the stoichiometric amount of $P_2S_5$. The reaction conveniently is effected by heating the oxyalkylenated hydroxyhydrocarbon and, with intimate stirring, adding the $P_2S_5$ thereto, preferably in incremental portions. The reaction is effected by refluxing the mixture of reactants to effect formation of the di-(oxyalkylenated hydroxyhydrocarbon)-dithiophosphate with the liberation of one mole proportion of hydrogen sulfide.

The reaction preferably is effected in the presence of a solvent and the temperature of refluxing accordingly will depend upon the specific solvent used. Any suitable solvent may be employed. Preferred solvents comprise aromatic hydrocarbons and include particularly benzene. When using benzene as the solvent, the refluxing temperature will be in the order of 175° F. Other aromatic solvents include toluene, xylene, ethyl benzene, cumene, etc., or mixtures thereof. In another embodiment the solvent may comprise a paraffinic hydrocarbon or mixtures thereof which preferably are selected from hexane, heptane, octane, nonane, decane, undecane, dodecane, etc. As hereinbefore set forth, the refluxing temperature will depend upon the particular solvent employed and thus may range from about 140° and preferably should not exceed about 215° F. The reaction may be effected at atmospheric pressure or, when desired, at subatmospheric pressure or superatmospheric pressure.

Hydrogen sulfide is formed in the above reaction and preferably is continuously removed from the reaction zone. After completion of the reaction, the reaction mass may be filtered to remove unreacted $P_2S_5$, if any. In one embodiment the product may be recovered in solution in the benzene or other solvent or, when desired, the benzene solvent may be removed in any suitable manner such as by distillation, preferably under vacuum. The di-(oxyalkylenated hydroxyhydrocarbon)-dithiophosphate is recovered as a liquid of medium viscosity.

While the di-(oxyalkylenated hydroxyhydrocarbon)-dithiophosphate is a preferred reactant for forming the addition reaction product of the present invention, it is understood that the use of the mono-(oxyalkylenated hydroxyhydrocarbon)-dithiophosphate also is comprised within the scope of the present invention, as well as the mono- and/or di-(oxyalkylenated hydroxyhydrocarbon)-monothiophosphate. The latter compound may be prepared, for example, by reacting di-(oxyalkylenated hydroxyhydrocarbon)-phosphite or the sodium salt thereof with free sulfur.

The oxyalkylenated hydroxyhydrocarbon phosphate or thiophosphate is reacted with a polymeric reaction product containing basic nitrogen to form the novel addition product of the present invention. Any suitable polymeric condensation product containing basic nitrogen may be used. In one embodiment the reaction product is prepared by the condensation of (1) a compound selected from the group consisting of an amine containing at least three nitrogen atoms and an alkanol amine containing at least three of a mixture of amine and hydroxyl groups with (2) a compound selected from the group consisting of polycarboxylic acid, anhydride thereof and ester thereof. It is essential that the amine contains at least three nitrogen atoms in order that the polymer contains basic nitrogen. The amine preferably contains from four and more particularly from six to about fifty carbon atoms. Illustrative amines containing at least three nitrogen atoms include diethylenetriamine, dipropylenetriamine, dibutylenetriamine, dipentylenetriamine, dihexylenetriamine, diheptylenetriamine, dioctylenetriamine, etc., triethylenetetraamine, tripropylenetetraamine, tributylenetetraamine, tripentylenetetraamine, trihexylenetetraamine, triheptylenetetraamine, trioctylenetetraamine, etc., tetraethylenepentaamine, tetrapropylenepentaamine, tetrabutylenepentaamine, tetrapentylenepentaamine, tetrahexylenepentaamine, tetraheptylenepentaamine, tetraoctylenepentaamine, etc., pentaethylenehexaamine, pentapropylenehexaamine, pentabutylenehexaamine, pentapentylenehexaamine, pentahexylenehexaamine, pentaheptylenehexaamine, pentaoctylenehexaamine, etc., and particularly these alkylene polyamines in which at least one and preferably at least two of the nitrogen atoms contain aliphatic substituents having from one to twenty carbon atoms and preferably from four to twelve carbon atoms each. Illustrative alkylated alkylene polyamines include the following. Here again, only the polyethylene polyamines will be specifically set forth with the understanding that the correspondingly alkylated polypropylene polyamines, polybutylene polyamines, polypentylene polyamines, etc., may be used. These illustrative compounds include N-butyl-diethylenetriamine, $N^1,N^3$ - dibutyl-diethylenetriamine, N-pentyl-diethylenetriamine, $N^1,N^3$ - dipentyl-diethylenetriamine, N-hexyl-diethylenetriamine, $N^1,N^3$-dihexyl-diethylenetriamine, N-heptyl - diethylenetriamine, $N^1,N^3$-diheptyl-diethylenetriamine, N-octyl-diethylenetriamine, $N^1,N^3$-dioctyl-diethylenetriamine, N-nonyl-diethylenetriamine, $N^1,N^3$-dinonyl-diethylenetriamine, N-decyl-diethylenetriamine, $N^1,N^3$-didecyl-diethylenetriamine, N-undecyl-diethylenetriamine, $N^1,N^3$ - diundecyl-diethylenetriamine, N-dodecyl-diethylenetriamine, $N^1,N^3$-didodecyl-diethylenetriamine, etc., N-butyl-triethylenetetraamine, $N^1,N^4$-dibutyl-triethylenetetraamine, N-pentyltriethylenetetraamine, $N^1,N^4$-dipentyl-triethylenetetraamine, N-hexyl-triethylenetetraamine, $N^1,N^4$ - dihexyl-triethylenetetraamine, N-heptyl-triethylenetetraamine, $N^1,N^4$-diheptyl-triethylenetetraamine, N-octyl-triethylenetetraamine, $N^1,N^4$-dioctyl-triethylenetetraamine, N-nonyl-triethylenetetraamine, $N^1,N^4$-dinonyltriethylenetetraamine, N-decyl-triethylenetetraamine, $N^1,N^4$-didecyl-triethylenetetraamine, etc., N-butyl-tetraethylenepentaamine, $N^1,N^5$-dibutyl-tetraethylenepentaamine, N-pentyl - tetraethylenepentaamine, $N^1,N^5$-dipentyl-tetraethylenepentaamine, N-hexyl - tetraethylenepentaamine, $N^1,N^5$-dihexyl-tetraethylenepentaamine, N-heptyl-tetraethylenepentaamine, $N^1,N^5$-diheptyl-tetraethylenepentaamine, N-octyl - tetraethylenepentaamine, $N^1,N^5$-dioctyl-tetraethylenepentaamine, etc. It will be noted that, in the dialkylated compounds specifically set forth above, the alkyl groups are positioned on the terminal nitrogen atoms. It is understood that one or more of the intermediate nitrogen atoms may contain alkyl substituents, either with or without substitutions on the terminal nitrogen atoms, and that cycloalkyl substituents, particularly cyclohexyl, may replace all or a part of the alkyl substituents.

As hereinbefore set forth, the alkanolamine for use in preparing the polymer contains at least three of a mixture of amine and hydroxyl groups. Here again, this is essential in order that the polymer will contain basic nitrogen. Accordingly, the alkanolamine will contain at least two nitrogen and at least one hydroxyl or at least one nitrogen and at least two hydroxyl groups and contains from four and preferably from six to about fifty carbon atoms. The embodiment of the alkanolamine containing one nitrogen and two hydroxyl groups are dialkanolamines and preferably N-aliphatic-dialkanolamines in which the aliphatic group attached to the nitrogen atom contains from one to about fifty carbon atoms and preferably from about twelve to about twenty-two carbon atoms. The alkanol groups preferably contain from about two to about four carbon atoms each, although it is understood that they may contain up to about twenty carbon atoms each. Preferably the N-aliphatic-dialkanolamine is an N-alkyldiethanolamine. Illustrative compounds include N-methyl-diethanolamine,
N-ethyl-diethanolamine,
N-propyl-diethanolamine,
N-butyl-diethanolamine,
N-pentyl-diethanolamine,
N-hexyl-diethanolamine,
N-heptyl-diethanolamine,
N-octyl-diethanolamine,
N-nonyl-diethanolamine,
N-decyl-diethanolamine,
N-undecyl-diethanolamine,
N-dodecyl-diethanolamine,
N-tridecyl-diethanolamine,
N-tetradecyl-diethanolamine,
N-pentadecyl-diethanolamine,
N-hexadecyl-diethanolamine,
N-heptadecyl-diethanolamine,
N-octadecyl-diethanolamine,
N-nonadecyl-diethanolamine,
N-eicosyl-diethanolamine,
N-heneicosyl-diethanolamine,
N-docosyl-diethanolamine,
N-tricosyl-diethanolamine,
N-tetracosyl-diethanolamine,
N-pentacosyl-diethanolamine,
N-hexacosyl-diethanolamine,
N-heptacosyl-diethanolamine, N-octacosyl-diethanolamine,
N-nonacosyl-diethanolamine,
N-triacontyl-diethanolamine,
N-hentriacontyl-diethanolamine,
N-dotriacontyl-diethanolamine,
N-tritriacontyl-diethanolamine,
N-tetratriacontyl-diethanolamine,
N-pentatriacontyl-diethanolamine,
N-hexatriacontyl-diethanolamine,
N-heptatriacontyl-diethanolamine,
N-octatriacontyl-diethanolamine,
N-nonatriacontyl-diethanolamine,
N-tetracontyl-diethanolamine,
N-hentetracontyl-diethanolamine,
N-dotetracontyl-diethanolamine,
N-tritetracontyl-diethanolamine,
N-tetratetracontyl-diethanolamine,
N-pentatetracontyl-diethanolamine,
N-hexatetracontyl-diethanolamine,
N-heptatetracontyl-diethanolamine,
N-octatetracontyl-diethanolamine,
N-nonatetracontyl-diethanolamine,
N-pentacontyl-diethanolamine, etc.

In some cases, N-alkenyl-diethanolamines may be utilized. Illustrative N-alkenyl-diethanolamines include N-hexenyl-diethanolamine,
N-heptenyl-diethanolamine,
N-octenyl-diethanolamine,
N-noneyl-diethanolamine,
N-decenyl-diethanolamine,
N-undecenyl-diethanolamine,
N-dodecenyl-diethanolamine,
N-tridecenyl-diethanolamine,
N-tetradecenyl-diethanolamine,
N-pentadecenyl-diethanolamine,
N-hexadecenyl-diethanolamine,
N-heptadecenyl-diethanolamine,
N-octadecenyl-diethanolamine,
N-nonadecenyl-diethanolamine,
N-eicosenyl-diethanolamine, etc.

It is understood that the N-aliphatic-diethanolamines may contain aliphatic substituents attached to one or both of the carbon atoms forming the ethanol groups. These compounds may be illustrated by N-aliphatic-di-(1-methylethanolamine),
N-aliphatic-di-(1-ethylethanolamine),
N-aliphatic-di-(1-propylethanolamine),
N-aliphatic-di-(1-butylethanolamine),
N-aliphatic-di-(1-pentylethanolamine),
N-aliphatic-di-(1-hexylethanolamine), etc.,
N-aliphatic-di-(2-methylethanolamine),
N-aliphatic-di-(2-ethylethanolamine),
N-aliphatic-di-(2-propylethanolamine),
N-aliphatic-di-(2-butylethanolamine),
N-aliphatic-di-(2-pentylethanolamine),
N-aliphatic-di-(2-hexylethanolamine), etc.

It is understood that these specific compounds are illustrative only and that other suitable compounds containing the diethanolamine configuration may be employed.

The specific compounds hereinbefore set forth are examples of N-aliphatic-diethanolamines. Other N-aliphatic-dialkanolamines include N-aliphatic-dipropanolamines and N-aliphatic-dibutanolamines, although N-aliphatic-dipentanolamines, N-aliphatic-dihexanolamines and higher dialkanolamines may be used in some cases. It is understood that these dialkanolamines may be substituted in a manner similar to that specifically described hereinbefore in connection with the discussion of the diethanolamines. Further, it is understood that mixtures of N-aliphatic-dialkanolamines may be employed, preferably being selected from those hereinbefore set forth, and that the substitution may comprise cycloalkyl and particularly cyclohexyl. Also, it is understood that the various dialkanolamines are not necessarily equivalent.

A number of N-alkyl-diethanolamines are available commercially and are advantageously used in preparing the condensation product. For example, N-tallow-diethanolamine is available under the trade name of "Ethomeen T/12." This material is a gel at room temperature, has an average molecular weight of 354 and a specific gravity at 25°/25° C. of 0.916. The alkyl substituents contain from about twelve to twenty carbon atoms per group and mostly sixteen to eighteen carbon atoms. Another mixed product is available commercially under the trade name of "Ethomeen S/12" and is N-soya-diethanolamine. It is a gel at room temperature, has an average molecular weight of 367 and a specific gravity at 25°/25° C. of 0.911. The alkyl substituents contain sixteen to eighteen carbon atoms per group. Still another commercial product is "Ethomeen C/12," which is N-coco-diethanolamine, and is a liquid at room temperature, has an average molecular weight of 303 and a specific gravity at 25°/25° C. of 0.874. The alkyl groups contain mostly twelve carbon atoms per group, although it also contains groups having from eight to sixteen carbon atoms per group. Still another commercially available product is N-stearyl-diethanolamine, which is marketed under the trade name of "Ethomeen 18/12." This product is a solid at room temperature, has an average molecular weight of 372 and a specific gravity at 25°/25° C. of 0.959. It contains eighteen carbon atoms in the alkyl substituent.

When the alkanolamine contains two nitrogen and one hydroxyl group, a preferred alkanolamine is aminoalkyl alkanolamine. Here again, the alkanolamine contains from four and preferably from six to about fifty carbon atoms. Illustrative compounds include aminoethyl ethanolamine, aminoethyl propanolamine, aminoethyl butanolamine, aminoethyl pentanolamine, aminoethyl hexanolamine, etc., aminopropyl ethanolamine, aminopropyl propanolamine, aminopropyl butanolamine, aminopropyl pentanolamine, aminopropyl hexanolamine, etc., aminobutyl ethanolamine, aminobutyl propanolamine, aminobutyl butanolamine, aminobutyl pentanolamine, aminobutyl hexanolamine, etc., aminopentyl ethanolamine, aminopentyl propanolamine, aminopentyl butanolamine, aminopentyl pentanolamine, aminopentyl hexanolamine, etc., aminohexyl ethanolamine, aminohexyl propanolamine, aminohexyl butanolamine, aminohexyl pentanolamine, aminohexyl hexanolamine, etc. Here again, one or both of the nitrogen atoms of the aminoalkyl alkanolamine may contain hydrocarbon substituents and particularly alkyl group or groups of from one to twenty carbon atoms each or cycloalkyl groups and particularly cyclohexyl, or mixtures thereof.

The amine containing at least three nitrogen atoms or the alkanolamine containing at least three of a mixture of amine and hydroxyl groups is reacted with an aliphatic or carbocyclic polycarboxylic acid consisting of carbon, hydrogen and oxygen, anhydride thereof or ester thereof. The polycarboxylic acid preferably comprises a dicarboxylic acid. Illustrative dicarboxylic acids include oxalic, malonic, succinic, glutaric, adipic, pimelic, suberic, azelaic, sebacic, maleic, fumaric, itaconic, citraconic, mesaconic, etc. While the dicarboxylic acids are preferred, it is understood that polycarboxylic acids containing three, four or more carboxylic acid groups may be employed. Furthermore, it is understood that a mixture of polycarboxylic acids and particularly of dicarboxylic acids may be used. A number of relatively inexpensive dicarboxylic acids comprising a mixture of these acids are marketed commercially under various trade names, including "VR-1 Acid," "Dimer Acid," "Empol 1022," etc., and these acids may be used in accordance with the present invention. For example, "VR-1 Acid" is a mixture of dicarboxylic acids and has an average molecular weight of about 700, is a liquid at 77° F., has an acid number of about 150 and and iodine number of about 36. It contains thirty-six carbon atoms per molecule.

Another preferred polycarboxylic acid comprises a mixed acid being marketed commercially under the trade name of "Empol 1022." This dimer acid is a dilinoleic acid and is represented by the following general formula:

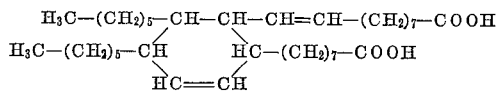

This acid is a viscous liquid, having an apparent molecular weight of approximately 600. It has an acid value of 180–192, an iodine value of 80–95, a saponification value of 185–195, a neutralization equivalent of 290–310, a refractive index at 25° C. of 1.4919, a specific gravity at 15.5° C./15.5° C. of 0.95, a flash point of 530° F., a fire point of 600° F., and a viscosity at 100° C. of 100 centistokes. The above-mentioned "Dimer Acid" is substantially the same as "Empol 1022." While the commercial unsaturated dimer acids may be used in applications where the double bond is detrimental, the reduced form of the acid is preferred.

While the polycarboxylic acid may be employed, advantages appear to be obtained in some cases when using anhydrides thereof and particularly alkenyl-acid anhydrides. A preferred alkenyl-acid anhydride is dodecenyl-succinic anhydride. Other alkenyl-acid anhydrides include butenyl-succinic anhydride, pentenyl-succinic anhydride, hexenyl-succinic anhydride, heptenyl-succinic anhydride, octenyl-succinic anhydride, nonenyl-succinic anhydride, decenyl-succinic anhydride, undecenyl-succinic anhydride, tridecenyl-succinic anhydride, tetradecenyl-succinic anhydride, pentadecenyl-succinic anhydride, hexadecenyl-succinic anhydride, heptadecenyl-succinic anhydride, octadecenyl-succinic anhydride, etc. While the alkenyl-succinic anhydrides are preferred, it is understood that the alkyl-succinic anhydrides may be employed, the alkyl groups preferably corresponding to the alkenyl groups hereinbefore specifically set forth. Similarly, while the aliphatic succinic anhydrides are preferred, it is understood that the anhydrides and particularly aliphatic-substituted anhydrides of other acids may be employed including, for example, adipic anhydride and particularly aliphatic adipic anhydrides, glutaric anhydride and particularly aliphatic glutaric anhydrides, etc.

It is understood that the aliphatic substituent attached to the amine, dialkanolamine and/or polycarboxylic acid, anhydride or ester may be either of straight chain or branched chain configuration. Also, it is understood that a mixture of different amines containing at least three nitrogen atoms and/or of alkanolamines containing at least three of a mixture of amine and hydroxyl groups may be used, as well as a mixture of polycarboxylic acids, anhydrides or esters.

The condensation of the particular amine set forth above or the particular alkanolamine set forth above with the polycarboxylic acid, anhydride or ester is effected in any suitable manner, and will include at least one of interhydroxyl reaction with the liberation of water to form a polyester containing basic nitrogen, the interaction of an amino group and a carboxyl group with the liberation of water to form a polyamide containing basic nitrogen and both of these reactions to form a polyester-polyamide containing basic nitrogen.

The reaction of the amine or alkanolamine with polycarboxylic acid, anhydride or ester generally is effected at a temperature above about 175° F. and preferably at a higher temperature, which usually will not exceed about 500° F., although higher or lower temperatures may be employed under certain conditions. The exact temperature will depend upon whether a solvent is used and, when employed, on the particular solvent. For example, with benzene as the solvent, the temperature will be of the order of 175° F., with toluene the temperature will be of the order of 250° F., and with xylene the order of 300–320° F. Other preferred solvents include cumene, naphtha, Decalin, etc. Any suitable amount of the solvent may be employed but preferably should not comprise a large excess because this will tend to lower the reaction temperature and slow the reaction. Water formed during the reaction may be removed in any suitable manner including, for example, by operating under reduced pressure, by removing an azeotrope of water-solvent, by distilling the reaction product at an elevated temperature, etc. A higher temperature may be utilized in order to remove the water as it is being formed. The time of reaction is sufficient to effect polymer formation and, in general, will range from about six to about forty hours or more. The amine or alkanolamine and acid preferably are reacted in equal mole proportions, although either reactant may be present in excess and especially up to two mole proportions of amine or alkanolamine per one mole of acid.

In another embodiment the polymeric reaction product containing basic nitrogen is obtained by reacting an epihalohydrin compound with an amine compound. A preferred epihalohydrin compound is epichlorohydrin. Other epichlorohydrin compounds include 1,2-epi-4-chlorobutane, 2,3-epi-4-chlorobutane, 1,2-epi-5-chloropentane, 2,3-epi-5-chloropentane, etc. While the chloro derivatives are preferred, it is understood that the corresponding bromo and iodo compounds may be employed.

One mole proportion of the epihalohydrin compound is reacted with one mole proportion of a suitable amine. Preferred amines include primary alkyl amines and preferably those containing from about twelve to about forty carbon atoms per molecule. Illustrative primary alkyl amines include dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, tricosyl amine, tetracosyl amine, pentacosyl amine, hexacosyl amine, heptacosyl amine, octacosyl amine, nonacosyl amine, triacontyl amine, hentriacontyl amine, dotriacontyl amine, tritriacontyl amine, tetratriacontyl amine, pentatriacontyl amine, hexatriacontyl amine, heptatriacontyl amine, octatriacontyl amine, nonatriacontyl amine, tetracontyl amine, etc. Conveniently the long chain amines are prepared from fatty acids or more particularly from mixtures of fatty acids formed as products or by-products. Such mixtures are available commercially, generally at lower prices and, as another advantage of the present invention, the mixtures may be used without the necessity of separating individual amines in pure state.

An example of such a mixture is hydrogenated tallow amine which is available under various trade names including "Alamine H26D" and "Armeen HTD." These products comprise mixtures predominating in alkyl amines containing sixteen to eighteen carbon atoms per alkyl group, although they contain a small amount of alkyl groups having fourteen carbon atoms.

Illustrative examples of secondary amines, which may be reacted with the epihalohydrin compound, include di-(dodecyl) amine, di-(tridecyl) amine, di-(tetradecyl) amine, di-(pentadecyl) amine, di-(hexadecyl) amine, di-(heptadecyl) amine, di-(octadecyl) amine, di-(nonadecyl) amine, di-(eicosyl) amine, etc. In another embodiment, which is not necessarily equivalent, the secondary amine will contain one alkyl group having at least twelve carbon atoms and another alkyl group having less than twelve carbon atoms. Illustrative examples of such compounds include N-propyl-N-dodecyl amine, N-butyl-N-dodecyl amine, N-pentyl-N-dodecyl amine, N-butyl-N-tridecyl amine, N-pentyl-N-tridecyl amine, etc. Here again, mixtures of secondary amines are available commercially, usually at a lower price, and such mixtures may be used in accordance with the present invention. An example of such a mixture available commercially is "Armeen 2HT" which consists primarily of di-(octadecyl) amine and di-(hexadecyl) amine.

Preferred examples of N-alkyl polyamines, which may be reacted with the epihalohydrin compound, comprise N-alkyl-1,3-diaminopropanes in which the alkyl group contains at least twelve carbon atoms. Illustrative examples include N-dodecyl-1,3-diaminopropane, N-tridecyl-1,3-diaminopropane, N-tetradecyl-1,3-diaminopropane, N-pentadecyl-1,3-diaminopropane, N-hexadecyl-1,3-diaminopropane, N-heptadecyl-1,3-diaminopropane, N-octadecyl-1,3-diaminopropane, N-nonadecyl-1,3-diaminopropane, N-eicosyl-1,3-diaminopropane, N-heneicosyl-1,3-diaminopropane, N-docosyl-1,3-diaminopropane, N-tricosyl-1,3-diaminopropane, N-tetracosyl-1,3-diaminopropane, N-pentacosyl-1,3-diaminopropane, etc. As before, mixtures are available commercially, usually at lower prices, of suitable compounds in this class and advantageously are used for the purposes of the present invention. One such mixture is "Duomeen T" which is N-tallow-1,3-diaminopropane and predominates in alkyl groups containing fourteen carbon atoms each. Another mixture available commercially is N-coco-1,3-diaminopropane which contains alkyl groups predominating in twelve to fourteen carbon atoms each. Still another example is N-soya-1,3-diaminopropane which predominates in alkyl groups containing eighteen carbon atoms per group, although it contains a small amount of alkyl groups having sixteen carbon atoms. It is understood that corresponding N-alkyl diaminobutanes, N-alkyl diaminopentanes, N-alkyl diaminohexanes, etc., may be employed.

In still another embodiment the amine comprises an alkylene polyamine including ethylenediamine, diethylenetriamine, triethylenetetraamine, tetraethylenepentaamine, pentaethylenehexaamine, etc., similar propylene and polypropylene polyamines, butylene and polybutylene polyamines, etc., and particularly these alkylene polyamines in which one or more of the nitrogen atoms are substituted with an alkyl group and preferably an alkyl group containing from about six to about twenty carbon atoms each or a cycloalkyl group including particularly cyclohexyl, alkylcyclohexyl, polyalkylcyclohexyl, etc. It is understood that a mixture of different amines and/or of different halo epoxides may be used.

The epihalohydrin and amine are reacted in any suitable manner. In a preferred embodiment, the reactants are prepared as solutions in suitable solvents, particularly alcohols such as ethanol, propanol, butanol, etc., and one of the solutions is added gradually, with stirring, to the other solution, and reacted at a temperature of from about 65° to about 215° F. and preferably 120° F. to about 215° F., and for a sufficient time to effect polymer formation, which generally will range from about two and preferably from about four to twenty-four hours or more.

In still another embodiment the polymeric reaction product formed by the reaction of the epihalohydrin compound and amine is reacted with an acid to form the ester which is later used in preparing the addition reaction product of the present invention. In one embodiment the acid is a low molecular weight acid including acetic, propionic, butyric, but preferably is a high molecular weight acid which conveniently is a fatty acid including valeric, caproic, caprylic, capric, lauric, myristic, stearic, decylenic, dodecylenic, palmityloleic, oleic, linoleic, gadoleic etc. Still other acids include pelargonic, undecylic, tridecylic, pentadecylic, etc. The esters are formed by refluxing the reactants under conditions to liberate water. Preferably at least one mole of acid is reacted per mole of the epihalohydrin-amine condensation product and may range up to the number of acid groups equal to the number of hydroxyl groups in the epihalohydrin-amine reaction product.

Another example of a polymeric condensation product containing a basic nitrogen is formed by the reaction of (1) an unsaturated compound having a polymerizable ethylenic linkage and (2) an unsaturated compound having a polymerizable ethylenic linkage and a basic nitrogen. Examples of the first mentioned unsaturated compound include saturated and unsaturated long chain esters of unsaturated carboxylic acids such as 2-ethylhexyl acrylate, nonyl acrylate, decyl acrylate, undecyl acrylate, dodecyl acrylate, tridecyl acrylate, tetradecyl acrylate, pentadecyl acrylate, hexadecyl acrylate, heptadecyl acrylate, octadecyl acrylate, etc., and particularly methacrylates including n-octyl methacrylate, n-nonyl methacrylate, 3,5,5-trimethylhexyl methacrylate, n-decyl methacrylate, sec-capryl methacrylate, lauryl methacrylate, dodecyl methacrylate, tridecyl methacrylate, tetradecyl methacrylate, pentadecyl methacrylate, hexadecyl methacrylate, cetyl methacrylate, heptadecyl methacrylate, octadecyl methacrylate, 9-octadecenyl methacrylate, etc.; unsaturated esters of long-chain carboxylic acids such as vinyl propionate, vinyl butyrate, vinyl octanoate, vinyl decanoate, vinyl dodecanoate, vinyl laurate, vinyl stearate; long-chain esters of vinyl dicarboxylic acids such as lauryl fumarate, methyl lauryl fumarate, stearyl fumarate and other fumaric acid esters, maleic acid esters, etc.; itaconic acid esters including butyl itaconate, pentyl itaconate, hexyl itaconate, heptyl itaconate, octyl itaconate, nonyl itaconate, decyl itaconate, undecyl itaconate, dodecyl itaconate, etc.; allyl esters including allyl propionate, allyl butyrate, allyl pentanoate, allyl hexanoate, allyl heptanoate, allyl octanoate, allyl decanoate, allyl dodecanoate, etc.; vinyl alkyl ethers including vinyl butyl ether, vinyl pentyl ether, vinyl hexyl ether, vinyl heptyl ether, vinyl octyl ether, vinyl nonyl ether, vinyl decyl ether, vinyl undecyl ether, vinyl dodecyl ether, etc.; olefins including butene, pentene, hexene, heptene, octene, nonene, decene, undecene, dodecene, tridecene, tetradecene, pentadecene, hexadecene, heptadecene, octadecene, nonadecene, eicosene, etc.; alkyl or acyl substituted styrenes including octyl styrene, nonyl styrene, decyl styrene, undecyl styrene, dodecyl styrene, tridecyl styrene, tetradecyl styrene, etc., acetyl styrene, propionyl styrene, butyryl styrene, valeryl styrene, stearoyl styrene, benzoyl styrene, etc.; N-long-chain hydrocrabon substituted amides of unsaturated acids such as N-hexadecyl acrylamide, N-heptadecyl acrylamide, N-octadecyl acrylamide, etc.

A particularly preferred compound for use as an unsaturated compound having a polymerizable ethylenic linkage is lauryl methacrylate and more particularly technical lauryl methacrylate which is obtained by esterification of a commercial mixture of long-chain alcohols in the $C_{10}$ to $C_{18}$ range derived from coconut oil. The technical lauryl methacrylate is available commercially at a lower price and, accordingly, is preferred. A typical technical lauryl methacrylate will contain in the ester portion carbon chain lengths of approximately 3% $C_{10}$, 61% $C_{12}$, 23% $C_{14}$, 11% $C_{16}$, and 2% $C_{18}$.

Examples of the second mentioned unsaturated compounds (those containing a basic amino nitrogen) include p-(beta-diethylaminoethyl)-styrene; basic nitrogen-containing heterocycles carrying a polymerizable ethylenically unsaturated substitutent such as the vinyl pyridines and the vinyl alkyl pyridines as, for example, 2-vinyl-5-methyl pyridine, 2-vinyl-5-ethyl pyridine; esters of basic amino alcohols with unsaturated carboxylic acids such as the alkyl and cyloalkyl substituted aminoalkyl and amino cycloalkyl esters of the acrylic and alkacrylic acids, as, for example, beta-methylaminoethyl acrylate, beta-dimethylaminoethyl acrylate, beta-diethylaminoethyl methacrylate, aminopropyl acrylate, aminopropyl methacrylate, N-alkylaminopropyl acrylate, N-dialkylaminopropyl methacrylate, N-dialkylaminopropyl acrylate, 4-diethylaminocyclohexyl methacrylate, beta-beta-didodecylaminoethyl acrylate, etc.; unsaturated ethers of basic amino alcohols such as the vinyl ethers of such alcohols as, for example, beta-aminoethyl vinyl ether, beta-diethylaminoethyl vinyl ether, etc.; amides of unsaturated carboxylic acids wherein a basic amino substitutent is carried on the amide nitrogen such as N-(beta-dimethylaminoethyl) - acrylamide; polymerizable unsaturated basic amines such as allylamine, methallylamine, N-alkyl allylamine, N,N-dialkyl allylamine, N-alkyl methallylamine, N,N-dialkyl methallylamine, diallylamine, etc.; morpholino acrylates such as 2-N-morpholine ethyl acrylate, 2-N-morpholine ethyl methacrylate, and the like.

The copolymer is prepared in any suitable manner and generally by heating the reactants at a temperature of from about 100° to about 175° F. for a period of time ranging from two to forty-eight hours or more, preferably in the presence of a catalyst or initiator such as benzoyl peroxide, tertiary butyl peroxide, azo compound as alpha, alpha'-azo-diisobutyronitrile, etc. The reaction generally is effected using from one to four mole proportions of one reactant per one mole proportion of the other reactant. When desired, the polymerization may be effected in the presence of a solvent and particularly aromatic hydrocarbons as hereinbefore set forth.

Another example of a polymeric condensation product containing basic nitrogen is prepared by copolymerizing a monomer set forth above as illustrative of the unsaturated compounds having a polymerizable ethylenic linkage with polycarboxylic acid, anhydride thereof or ester thereof including, for example, maleic acid, maleic anhydride, fumaric acid, itaconic acid, itaconic anhydride, glutaconic acid, muconic acid, acrylic acid, methacrylic acid, crotonic acid, etc., and alkyl esters of these acids containing from one to twenty carbon atoms in the alkyl moiety. The resulting copolymers then are reacted with a nitrogen-containing compound to produce a reaction product containing basic nitrogen. The nitrogen-containing compound must contain at least two amine groups or at least one amine and one hydroxyl group, the amine or alkanolamine preferably containing from four and more particularly from six to about fifty carbon atoms. Illustrative compounds of the first class include alkylamino alkyleneamines (which also may be named as N-alkyl alkylenediamines) in which the alkyl group contains from one and preferably from six to twenty carbon atoms each and the alkylene group contains from two to six or more carbon atoms, similarly substituted dialkylenetriamines, trialkylenetetraamines, tetraalkyl pentaamines, etc., N-dialkyl dialkylene-diamines in which each alkyl group contains from one and preferably from six to twenty carbon atoms each and in which the alkylene contains from two to six or more carbon atoms. Illustrative alkanolamines include alkanolamines in which the alkanol group contains from two to six or more carbon atoms and preferably N-alkyl alkanolamines and N-dialkyl alkanolamines in which the alkyl groups contain from one and preferably from six to twenty carbon atoms each and the alkanol contains from two to six or more carbon atoms. Illustrative examples of these alkanolamines include N-hexyl ethanolamine, N-heptyl ethanolamine, N-octyl ethanolamine, N-nonyl ethanolamine, N-decyl ethanolamine, N-undecyl ethanolamine, N-dodecyl ethanolamine, etc., N-dibutyl ethanolamine, N-dipentyl ethanolamine, N-dihexyl ethanolamine, N-diheptyl ethanolamine, N-dioctyl ethanolamine, N-dinonyl ethanolamine, N-didecyl ethanolamine, etc., N-hexyl propanolamine, N-heptyl propanolamine, N-octyl propanolamine, N-nonyl propanolamine, N-decyl propanolamine, N-undecyl propanolamine, N-dodecyl propanolamine, etc., N-dibutyl propanolamine, N-dipentyl propanolamine, N-dihexyl propanolamine, N-diheptyl propanolamine, N-dioctyl propanolamine, N-dinonyl propanolamine, N-didecyl propanolamine, etc. It is understood that the alkyl groups may be of primary, secondary or tertiary configuration.

In one method, the copolymer is first prepared and then reacted with the amine or alkanolamine or, in another method, one of the monomers is reacted with the amine or alkanolamine and then is reacted with the other monomer. The product will contain basic nitrogen and may comprise esters, amides or mixtures of these. As one illustration, maleic anhydride is copolymerized with an olefin as, for example, ethylene, diisobutylene, propylene trimer, butylene trimer, etc., and then is reacted with an N-alkyl-diaminopropane as, for example, N-tallow-1,3-diaminopropane or N-soya-1,3-diaminopropane or with an N-dialkyl alkanolamine as, for example, N-dimethyl ethanolamine, N-diethyl ethanolamine, N-dipropyl ethanolamine, N-dibutyl ethanolamine, N-dipentyl ethanolamine, N-dihexyl ethanolamine, N-diheptyl ethanolamine, N-dioctyl ethanolamine or with an N-dicycloalkyl ethanolamine and particularly N-dicyclohexyl ethanolamine or with an aminoalkyl ethanolamine as, for example, $N^1$-dibutyl-$N^2$-butylaminoethyl ethanolamine, $N^1$-dipentyl-$N^2$-pentylaminoethyl ethanolamine, $N^1$ - dihexyl - $N^2$-hexyl-aminoethyl ethanolamine, $N^1$ - diheptyl-$N^2$-heptylamino ethyl ethanolamine, $N^1$-dioctyl-$N^2$-octylaminoethyl ethanolamine, etc. The basic nitrogen-containing polymer produced in the above manner may include esters, amides, heterocyclic N-containing compounds including glyoxalidines or imidazolines, tetrahydropyrimidines, tetrahydropyridines, oxazolines, oxazolidines, imidazole, etc., or mixtures thereof.

In still another embodiment the polymeric condensation product containing a basic nitrogen is prepared by condensing certain nitrogen-containing compouds with a polyglycol substituted linear polyester of a dibasic acid and a diol. Details of the preparation of the polyglycol substituted linear polyesters are described in U.S. Patent 3,083,187, which disclosure is embodied as part of the present specification without repetition in the interest of brevity. The nitrogen-containing compound for condensation with the polyglycol substituted linear polyester is an amine containing at least three nitrogen atoms or an alkanolamine containing at least three of a mixture of amine and hydroxyl groups. These amines and alkanolamines are specifically set forth hereinbefore in the present specifications. The condensation of the nitrogen-containing compound and the polyester is effected under conditions to liberate water, which generally will be at a temperature of from about 220° to about 400° F. The resulting compounds will comprise polyesters, polyamides or mixtures thereof containing basic nitrogen.

The polymeric reaction products containing basic nitrogen specifically set forth in the present specifications may be summarized as being selected from the group consisting of (1) the condensation product of preferably one mole proportion of a compound selected from the group consisting of an amine containing at least three nitrogen atoms and an alkanolamine containing at least three of a mixture of amine and hydroxyl groups, each preferably containing from four and more particularly from six to about fifty carbon atoms, with one mole proportion of a compound selected from the group consisting of polycarboxylic acid, anhydride thereof and ester thereof;

(2) the reaction product of equimolar proportions of an epihalohydrin and an amine selected from the group consisting of primary and secondary alkylamines, and esters of said reaction product;

(3) the reaction product of an unsaturated compound having a polymerizable ethylenic linkage and an unsaturated compound having a polymerizable ethylenic linkage and basic nitrogen, preferably using from one to four mole proportions of one reactant per one mole proportion of the other reactant;

(4) the reaction product of a nitrogen-containing compound selected from the group consisting of an amine containing at least two amine groups and an alkanolamine containing at least one amine and one hydroxyl group, each preferably cotaining from four and more particularly from six to about fifty carbon atoms, with the condensation product of an unsaturated compound having a polymerizable ethylenic linkage and a compound selected from the group consisting of polycarboxylic acid, anhydride thereof and ester thereof; and (5) the reaction product of a nitrogen-containing compound selected from the group consisting of an amine containing at least three nitrogen atoms and an alkanolamine containing at least three of a mixture of amine and hydroxyl groups, each preferably containing from about four and more particularly from six to about fifty carbon atoms, with a polyglycol substituted linear polyester of a dibasic acid and a diol, the polyester having a total molecular weight of at least 5000 as measured by the light scattering method.

The above description illustrates several suitable polymeric reaction products containing basic nitrogen which may be used for forming the addition reaction products of the present invention. In the present specifications and claims, the term "basic nitrogen" is used in the generic sense to cover the primary, secondary and tertiary amines including, as stated above, the basic nitrogen-containing heterocyclics. It is understood that other suitable condensation products containing basic nitrogen may be reacted with the phosphate to form the novel addition products of the present invention. It also is understood that the different polymeric reaction or condensation products are not necessarily equivalent when used in forming the addition reaction product.

The oxyalkylenated hydroxyhydrocarbon phosphate or thiophosphate generally is reacted with the condensation product containing basic nitrogen in a proportion of from about 0.5 to about 1.0 acidic equivalents of phosphate or thiophosphate per one basic equivalent of condensation product. However, when the condensation product is prepared from an unsaturated acid, the phosphate or thiophosphate may be used in a proportion of phosphate or thiophosphate equivalents which are equal up to the total of both of the basic equivalent and double bonds in the condensation product. In other words, the thiophosphate preferably forms the addition salt with the basic nitrogen and any excess thiophosphate will add to the double bond in the condensation product. It is understood that applicant is not necessarily limited to the above explanation, but does believe that the reaction proceeds in this manner, and also that a further excess of either reaction may be employed when desired.

The reaction is effected in any suitable manner. The reaction is exothermic and preferably is controlled by effecting the same in the presence of an inert solvent. Any suitable solvent may be employed, an aromatic hydrocarbon being particularly preferred. The aromatic hydrocarbons include benzene, toluene, xylene, ethylbenzene, cumene, etc. Other solvents include saturated aliphatic esters, as ethyl acetate, amyl acetate, 2-ethylhexyl acetate, methyl propionate, methyl butyrate, ethyl butyrate, isopropyl butyrate, etc., saturated aliphatic nitriles as acetonitrile, propionitrile, etc., dioxane, nitrobenzene, chlorobenzene, chloroform, carbon tetrachloride, etc. The specific temperature of operation will depend upon whether a solvent is employed and, when used, upon the particular solvent. In general, the temperature may range from about atmospheric to about 200° F. and in some cases up to 300° F., although temperatures outside of this range may be employed, depending upon the specific reactants and solvents utilized. The time of reaction will range from instantaneous to several hours or more and generally from instantaneous to one hour. Detailed description of specific methods for effecting the reactions are given in the examples appended to the present specifications. The reaction normally readily is effected in the absence of a catalyst.

The addition reaction product generally is recovered as a viscous liquid. It may be marketed and used as such or as a solution in a suitable solvent including, for example, saturated paraffinic hydrocarbons including pentane, hexane, heptane, octane, etc., aromatic hydrocarbons including benzene, toluene, xylene, cumene, Decalin, etc., alcohols, ketones, etc. However, when the product is recovered in the absence of a solvent or when the product is not sufficiently soluble in the substrate, the desired solubility may be obtained by dissolving the product in a mutual solvent. Suitable solvents for this purpose comprise phenols and particularly alkylphenols or polyalkylphenols in which the alkyl group or groups contain from six to twenty carbon atoms. The phenol may be used in a concentration of from about 5% and preferably from about 25% to about 500% by weight and, more particularly, from about 30% to about 200% by weight of the addition reaction product of the present invention.

The addition reaction product of the present invention will have varied utility and is useful as an additive to organic substrates which undergo oxidative deterioration. In addition, the additive serves as a detergent-dispersant, peroxide decomposer, corrosion inhibitor, extreme pressure and lubricity additive, etc. Organic substrates includes gasoline, naphtha, kerosene, jet fuel, lubricating oil, diesel fuel, fuel oil, residual oil, drying oil, grease, wax, resin, plastic, rubber, etc.

The addition reaction product of the present invention is advantageously used as an additive in lubricating oil. The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other oils include those of animal, marine or vegetable origin.

The lubricating oils generally have a viscosity within the range of from 10 SUS at 100° F. to 1000 SUS at 210° F. (SAE viscosity numbers include the range from SAE 10 to SAE 160). The petroleum oils are obtained from paraffinic, naphthenic, asphaltic or mixed base crudes. When highly paraffinic lubricating oils are used, a solubilizing agent also is used.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentane-diol-di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters, in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes such as trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., esters and particularly triesters in which the ester portions each contain from three to twelve carbon atoms and may be selected from those hereinbefore specifically set forth in connection with the discussion of the neopentyl glycol esters, (3) complex esters composed of reaction products of trimethylol alkane (as trimethylol propane), pentaerythritol, in fact any di- or polyglycol with a dibasic acid, the remaining hydroxyl groups being then esterified with monocarboxylic acids, and (4) tricresylphosphate, trioctylphosphate, trinonylphosphate, tridecylphosphate, as well as mixed aryl and alkyl phosphates, etc.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N - n - octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present inventon.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

The concentration of the addition reaction product to be employed as an additive will depend upon the particular substrate in which it is to be used. In general, the additive is used in a concentration of from about 0.001% to about 25% by weight of the substrate and more specifically within the range of from about 0.01% to about 5% by weight of the substrate. When used in conventional lubricating oil, the additive generally may be employed in a concentration of from about 0.01% to about 2% by weight of the oil. When used in lubricating oil for more severe operations, such as hypoid gear oil, the additive is used in a concentration of from about 1% to about 10% or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5% to 5% by weight of the oil. When used in cutting oil, rolling oil, soluble oil, drawing compound, etc., the additive may be used in a concentration of from about 0.1% to about 10% by weight of the oil. When used in slushing oil, the additive may be used in a concentration of from about 0.1% to about 15% by weight or more of the oil.

It is understood that the additive of the present invention may be used along with other additives incorporated in the organic substrate. The other additives will depend upon the particular organic substrate. For example, in lubricating oil, the additional additives may comprise one or more of viscosity index improver, pour point depressor, anti-foam additive, detergent, corrosion inhibitor, additional antioxidant, etc. Preferred additional antioxidants are of the phenolic type and include tertiarybutylcatechol, 2,6-ditertiarybutyl-4-methylphenol, 2,4-dimethyl-6-tertiarybutylphenol, etc., 2-tertiarybutyl-4-methoxyphenol, 2-tertiarybutyl-4-ethoxyphenol, tetratertiarybutyl-dihydroxydiphenyl methane, etc.

Some of the addition reaction products of the present invention are emulsifying agents and therefore will serve to emulsify water and oil of lubricating viscosity for use as lubricating oil, slushing oil, cutting oil, rolling oil, soluble oil, drawing compound, etc. When desired, an additional emulsifying agent may be employed. Any suitable emulsifying agent can be used, including alkali metal sulfonates of petroleum sulfonic acids, mahogany sulfonates, naphthenic acids, fatty acids, etc., fatty alcohol sulfonates, pentaerythritol oleates, laurates, etc. The amount of water used in the emulsified oils will depend upon the particular use of the emulsion and may range from 0.25% to 50% or even up to 98% by weight of the composition.

In another embodiment the reaction products of the present invention possess insecticidal properties with good inner-therapeutic action. They may be employed against many types of mites and insects such as, for example, Corausius larvae, Cotoneaster aphid, apple aphid, black bean aphid, aster aphid, green peach aphid, chrysanthemum aphid, pea aphid, etc. The reaction products or mixture of these may be used for the control of various larvae, mites, eggs of mites and such insects as flour beetle, mexican bean beetle, black carpet beetle, milkweed bug, german cockroaches, southern army worms, mealy bug, sow bug, citrus red spider, greenhouse red spider, various mosquitoes, yellow fever mosquito, malarial mosquito, houseflies, etc.

The additive of the present invention is incorporated in the substrate in any suitable manner and preferably the mixture is suitably agitated or otherwise mixed in order to obtain intimate admixing of the additive and of the substrate. When the substrate comprises a mixture of two or more components, the additive of the present invention may be commingled with one of the components prior to mixing with the remaining component or components of the substrate.

The following examples are introduced to illustrate further the novelty and utility of the present invention but not with the intention of unduly limiting the same.

*Example 1*

The addition reaction product of this example was prepared by reacting di-(oxyethylenated nonylphenol)-phosphate, containing an average of five oxyethylene groups per each nonylphenyl group, with the polymeric reaction product of dodecenyl succinic anhydride and N-tallow-diethanolamine (Ethomeen T/12). The polymeric reaction product was prepared by refluxing 141 g. (0.5 mole) of dodecenyl succinic anhydride and 192 g. (0.5 mole) of N-tallow-diethanolamine in the presence of 100 g. of decalin and 50 g. of xylene. A total of 10 cc. of water was collected. Following completion of the reaction, all solvent was removed under water pump vacuum at 383° F. The polymeric reaction product had a basic nitrogen equivalent of 1.60 meq./g. and a basic mole combining weight of 625.

The addition reaction product was prepared by mixing and heating on a steam bath 31.25 g. (0.05 basic equivalent) of the above polymeric reaction product and 55.85 g. (0.05 acidic equivalent) of di-(oxyethylenated nonylphenol)-phosphate, containing an average of 5 oxyethylene groups. The product was recovered as a heavy amber oil having an index of refraction $n_D^{20}$ of 1.4927.

*Example II*

The addition reaction product of this example was prepared by reacting a mixture of di-(oxyethylenated nonylphenol)-phosphate, containing an average of five oxyethylene groups per each nonylphenyl group, and di-(oxyethylenated nonylphenol)-dithiophosphate, containing an average of eight oxyethylene groups per each nonylphenyl group, with a nitrogen-containing copolymer prepared by reacting dodecenyl succinic anhydride with N-soya-diethanolamine (Ethomeen S/12). The copolymer containing basic nitrogen was prepared by reacting 76.5 g. (0.25 mole) of dodecenyl succinic anhydride with 91.75 g. (0.25 mole) of N-soya-diethanolamine in the presence of 100 g. of decalin and 50 g. of xylene as solvent. The mixture was refluxed first at 360° F., during which time 4.5 cc. of water was collected, and then further refluxed at 420° F. The polymeric reaction product had a basic nitrogen equivalent of 1.49 meq./g. and a basic mole combining weight of 672.

The polymeric reaction product, prepared in the above manner, was reacted with the mixture of phosphate and thiophosphate by commingling 33.6 g. (0.05 basic equivalent) of the polymeric reaction product, 41.888 g. (0.0375 acidic equivalent which is equal to ¾ of 0.05 equivalent) of di-(oxyethylenated nonylphenol)-phosphate, containing an average of five oxyethylene groups, and 18.125 g. (0.0125 acidic equivalent which is equal to ¼ of 0.05 equivalent) of di-(oxyethylenated nonylphenol)-dithiophosphate, containing an average of eight oxyethylene groups. The mixture was heated on a steam bath with intimate stirring. The addition reaction product was recovered as a heavy amber oil having an index of refraction $n_D^{20}$ of 1.4974.

*Example III*

Another reaction product, similar to that described in Example II, was made with the exception that the phosphate and dithiophosphate were used in equal equivalent proportions. The polymeric reaction product was prepared by refluxing 70.5 g. (0.25 mole) of dodecenyl succinic anhydride and 91.75 g. (0.25 mole) of N-soya-diethanolamine (Ethomeen S/12) in the presence of 100 g. of decalin and 50 g. of xylene. A total of 6.3 cc. of water was collected. The polymeric reaction product had a basic nitrogen equivalent of 1.50 meq./g. and a basic mole combining weight of 667.

The addition reaction was effected by commingling 33.35 g. (0.05 basic equivalent) of the above polymeric reaction product, 27.925 g. (0.025 acidic equivalent) of di(oxyethylenated nonylphenol)-phosphate, containing an average of five oxyethylene groups per each nonylphenyl group, and 36.25 g. (0.025 acidic equivalent) of di-(oxyethylenated nonylphenol)-dithiophosphate containing an average of eight oxyethylene groups per each nonylphenyl group. The reactants were heated on a steam bath with intimate mixing. The product was recovered as a heavy amber oil having an index of refraction $n_D^{20}$ of 1.4996.

*Example IV*

The addition reaction product of this example is prepared by reacting di-(oxyethylenated nonylphenol)-dithiophosphate with the condensation product of dodecenyl succinic anhydride and N-coco-diethanolamine. The condensation product was prepared by refluxing 141 g. (0.5 mole) of dodecenyl succinic anhydride and 153 g. (0.5 mole) of N-coco-diethanolamine (Ethomeen C/12) in the presence of 100 g. of Decalin and 50 g. of xylene. Refluxing was continued for about two hours and a total of 9 cc. of water was collected. The temperature of refluxing was 374° F. Following completion of the reaction, the solvent was removed under water pump vacuum at 347° F. The polymeric reaction product had a basic nitrogen equivalent of 1.74 meq./g. and a mole combining weight of 575.

The addition reaction product was prepared by mixing and heating on a steam bath 28.75 g. (0.05 basic equivalent) of the polymeric reaction product described above and 72.5 g. (0.05 acidic equivalent) of di-(oxyethylenated nonylphenol)-dithiophosphate containing an average of eight oxyethylene groups per each nonylphenyl group. The product was recovered as a heavy amber oil having an index of refraction $n_D^{20}$ of 1.5062.

*Example V*

The addition reaction product of this example was prepared by reacting di-(oxyethylenated nonylphenol)-phosphate, containing an average of five oxyethylene groups per each nonylphenyl group, with the polymeric reaction product prepared by reacting maleic anhydride with ethylene. The polymeric reaction product was prepared by dissolving 60 g. of maleic anhydride in 400 g. of toluene and adding 3 g. of benzoyl peroxide. The mixture was sealed into an autoclave and 10 atmospheres of ethylene were charged to the autoclave being heated to 212° F. Following completion of the reaction, the resulting suspension was digested with hot toluene on a steam bath and the product was filtered. A mixture of 42 g. of the above copolymer and 270 g. of N-tallow-1,3-diaminopropane ("Duomeen T") was heated and stirred. Gelling occurred at about 212° F. The mixture was heated and stirred to about 258° F., following which 200 g. of xylene were added and the mixture was refluxed at a temperature of about 310° F. A total of 8 cc. of water was collected after 12 hours of refluxing. The polymer had a basic equivalent of 3.29 meq./g.

The addition reaction product was prepared by commingling with stirring 15.2 g. (0.05 basic equivalent) of the above polymer and 55.85 g. (0.05 acidic equivalent) of di-(oxyethylenated nonylphenol)-phosphate containing an average of five oxyethylene groups. An exothermic reaction ensued. The addition reaction product was recovered as a viscous oil having an index of refraction $n_D^{20}$ of 1.4943.

*Example VI*

The addition reaction product of this example was prepared by reacting di-(oxyethylenated nonylphenol)-dithiophosphate, containing one oxyethylene group per each nonylphenyl group, with a polymer formed by condensing hydrogenated tallow amine and epichlorohydrin. The polymer was prepared by forming a solution of epichlorohydrin in a solvent mixture of xylene and 2-propanol and forming a separate solution of the hydrogenated tallow amine. These solutions were mixed in equal mole proportions. One-half of the amine was added gradually to the epichlorohydrin solution with stirring and heating at 130–140° F. Then the remaining portion of the hydrogenated tallow amine was added with continuous stirring and reacting at about 175° F. One-half mole proportion of sodium hydroxide was added and the mixture was heated at about 190° F., after which another one-half mole proportion of sodium hydroxide was added and the mixture stirred and reacted at about 190° F. for about one hour. Following completion of the reaction, the mixture was cooled, filtered and the filtrate distilled under vacuum to remove the alcohol and xylene solvents.

The addition reaction product was prepared by mixing and heating on a steam bath 15.50 g. of the above condensation product with 14.24 g. of di-(oxyethylenated nonylphenol)-dithiophosphate containing one oxyethylene group. The product was recovered as an amber grease having an index of refraction $n_D^{20}$ of 1.5265.

*Example VII*

The addition reaction product of this example was prepared in substantially the same manner described in Example VI, except that an ester of the amine-epichlorohydrin condensation product was used. The ester was prepared by refluxing 15.50 g. of the polymeric reaction product of hydrogenated tallow amine and epichlorohydrin with 320 g. of pelargonic acid at 353° F. A total of 37 cc. of water was collected. The ester had a basic nitrogen equivalent of 1.99 meq./g.

The addition reaction product was prepared by mixing and heating on a steam bath 10.06 g. (equivalent to 0.2 mole of basic nitrogen) and 0.2 moles of di-(oxyethylenated nonylphenol)-dithiophosphate containing one oxyethylene group per each nonylphenyl group. An exothermic reaction occurred upon mixing. The product was recovered as a heavy amber oil.

*Example VIII*

The addition reaction product of this example was prepared in the same manner described in Example VII, except that the dithiophosphate contained an average of six oxyethylene groups per each nonylphenyl group. The addition reaction product was prepared by mixing and heating on a steam bath 10.06 g. (equivalent to 0.02 mole of basic nitrogen) of the pelargonic acid ester of the hydrogenated tallow amine-epichlorohydrin reaction product, prepared as described in Example VII, and 37.28 g. (0.025 acidic equivalent) of di-(oxyethylenated nonylphenol)-dithiophosphate containing an average of six oxyethylene groups. Here again, an exothermic reaction ensued. The product was recovered as a heavy amber oil having an index of refraction $n_D^{20}$ of 1.5035.

*Example IX*

The addition reaction product of this example was prepared by reacting di-(oxyethylenated nonylphenol)-dithiophosphate, containing an average of six oxyethylene groups per each nonylphenyl group, with the polymeric reaction product of N-tallow-1,3-diaminopropane and epichlorohydrin. The polymeric reaction product was prepared in substantially the same manner as described in Example V, except that N-tallow-1,3-diaminopropane ("Duomeen T") was used instead of the hydrogenated tallow amine.

The addition reaction product was prepared by mixing and heating on a steam bath 5.78 g. of the N-tallow-1,3-diaminopropane-epichlorohydrin reaction product and 18.64 g. of di-(oxyethylenated nonylphenol)-dithiophosphate containing an average of six oxyethylene groups. The product was recovered as a heavy amber oil having an index of refraction $n_D^{20}$ of 1.5128.

*Example X*

The addition reaction product of this example was prepared by reacting di-(oxyethylenated nonylphenol)-dithiophosphate, containing one oxyethylene group per each nonylphenyl group, with a copolymer prepared by reacting lauryl methacrylate and beta-diethylaminoethyl methacrylate. The copolymer is prepared by copolymerizing lauryl methacrylate and diethylaminoethyl methacrylate in concentrations to yield a product having 80% by weight of lauryl methacrylate and 20% by weight of diethylaminoethyl methacrylate. The polymerization is effected by heating the reactants at about 140° F. for about eighteen hours, with vigorous stirring in the presence of benzoyl peroxide catalyst. The product is recovered as a viscous yellow liquid.

The addition reaction product was prepared by mixing and heating on a steam bath 435 g. (0.1 mole basic equivalent) of the above copolymer and 57.8 g. (0.1 mole acidic equivalent) of di-(oxyethylenated nonylphenol)-dithiophosphate containing one oxyethylene group. Here again, an exothermic reaction occurred. The product was recovered as a heavy amber oil having an index of refraction $n_D^{20}$ of 1.4816.

*Example XI*

The addition reaction product of this example was prepared in substantially the same manner described in Example X, except that the dithiophosphate contained an average of six oxyethylene groups per each nonylphenyl group. This reaction was effected by mixing and heating on a steam bath 43.5 g. (0.01 mole basic equivalent) of the lauryl methacrylate-beta-diethylaminoethyl methacrylate polymer, prepared as described in Example IX, and 18.64 g. (0.01 acidic equivalent) of di-(oxyethylenated nonylphenol-dithiophosphate containing an average of six oxyethylene groups. The product was recovered as a heavy amber oil having an index of refraction of $n_D^{20}$ of 1.4848.

*Example XII*

The addition reaction product of this example is prepared by reacting di-(oxypropylenated octylphenol)-phosphate, containing an average of three oxypropylene groups per each octylphenyl group, with the polymeric reaction product of dodecenyl succinic anhydride and N-decyl-diethylenetriamine. The polymeric reaction product is prepared by refluxing equal mole proportions of dodecenyl succinic anhydride and N-decyl-diethylenetriamine in the presence of cumene solvent. After cooling and collecting of the polymeric reaction product, it is mixed in equal mole proportions with di-(oxypropylenated octylphenol)-phosphate, containing an average of three oxypropylene groups per each octylphenyl group, and the mixture is heated on a steam bath with intimate stirring. The addition reaction product is recovered as a heavy amber oil.

*Example XIII*

The compound of this example is the addition reaction product of di-(oxypropylenated dodecanol)-dithiophosphate, containing an average of five oxypropylene groups per each dodecyl group, and the reaction product of polyglycol substituted linear polyester and $N^1,N^2,N^3$-trioctyl-diethylenetriamine. The polyester is prepared by reacting butoxyeicosaethylene glycol ether of tartronic acid, hydrogenated dilinoleic acid and $N^1,N^2,N^3$-trioctyl-diethylenetriamine. The reaction mixture is heated at 392° F. and the water formed in the reaction is removed. To facilitate handling, mineral lubricating oil is added to the reaction product. The reaction product then is reacted with di-(oxypropylenated dodecanol)-dithiophosphate, containing an average of five oxypropylenated groups per each dodecyl group, by heating the mixture on a steam bath with intimate stirring.

*Example XIV*

As hereinbefore set forth, the addition reaction products of the present invention are of especial utility as additives in lubricating oils. One method of evaluating lubricating oils is by the Falex machine. This procedure is described in detail in a book entitled "Lubricant Testing" authored by E. G. Ellis and published by Scientific Publications (Great Britain) Limited, 1953, pages 150–154. Briefly, the Falex machine consists of a rotating pin which runs between two V shape bearings which are spring loaded against the pin and provided with means for varying the load. The oil to be tested is poured into a metal trough in which the pin and bearings are partly submerged. The machine was operated for five minutes each at 250 and 500 pound loads and then forty-five minutes at 750 pound load. The data collected includes the temperature of the oil at each of the loads and the torque in pounds per square inch at each load, as well as the wear which is determined by a ratchet wheel arrangement in which the teeth are advanced in order to maintain the desired load. Each tooth is equivalent to approximately 0.000022 inch. Preferred additives are those which impart low temperature, low torque and low wear to the oil.

In another series of tests the machine was operated for five minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature.

The lubricating oil used in this example is dioctyl sebacate synthetic lubricating oil marketed under the trade name of "Plexol 201".

Run No. 1 in the following table is a run made using the "Plexol" not containing an additive and thus is the blank or control run.

Run No. 2 is a run made using another sample of "Plexol" to which had been added two percent by weight of the addition reaction product prepared as described in Example I.

Run No. 3 is a run made using another sample of "Plexol" to which had been added two percent by weight of the addition reaction product prepared as described in Example II.

Run No. 4 is made using another sample of "Plexol" to which had been added two percent by weight of the addition reaction product prepared as described in Example III.

Run No. 5 is made using another sample of "Plexol" to which had been added two percent by weight of the addition reaction product prepared as described in Example IV.

Run No. 6 is made using another sample of "Plexol" to which had been added two percent by weight of the addition reaction product prepared as described in Example V.

A. H. Carnes Company as "Carnes 340 White Oil." Typical specifications of this oil include the following:

| | |
|---|---|
| Distillation range, °F. | 740–975 |
| Specific gravity at 60° F. | 0.8836 |
| Viscosity at: | |
| 100° F. | 360 |
| 210° F. | 52.2 |
| Flash point, COC, °F. | 440 |
| Pour point, °F. | −20 |
| Refractive index at 68° F. | 1.4805 |
| Saybolt color | +30 |

Run No. 7 in the following table is a run using the white oil not containing an additive and thus is the blank or control run.

Run No. 8 is a run using another sample of the white oil to which had been added two percent by weight of the addition reaction product of Example I.

Run No. 9 is a run using another sample of the white oil to which had been added two percent by weight of the addition reaction product of Example II.

Run No. 10 is a run using another sample of the white oil to which had been added two percent by weight of the addition reaction product of Example III.

Run No. 11 is a run using another sample of the white oil to which had been added two percent by weight of the addition reaction product of Example IV.

Run No. 12 is a run using another sample of the white

TABLE I

| Run No. | Temperature, °F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temp., °F. |
| 1 | 150 | 231 | 490–S | 3–4 | 9–10 | 18–S | 0 | 0 | S | 750 | 2 | 490 |
| 2 | 142 | 213 | 345 | 4–5 | 9–12 | 17–19 | 0 | 0 | 4 | 1,500 | 0.25 | 525 |
| 3 | 141 | 215 | 288 | 3–5 | 9–12 | 13–17 | 0 | 0 | 11 | 1,250 | 3.25 | 450 |
| 4 | 143 | 211 | 355 | 3–5 | 9–12 | 16–23 | 0 | 0 | 7 | 1,400 | <0.1 | 488 |
| 5 | 150 | 253 | 325 | 4–5 | 13–16 | 17–18 | 0 | 0 | 18 | 1,500 | 2.2 | 550 |
| 6 | 148 | 240 | 330 | 4–5 | 11–13 | 15–18 | 0 | 0 | 6 | 1,500 | 1.3 | 475 |

S—Seizure.

From the data in the above table, it will be seen that the dioctyl sebacate without additive (Run No. 1) underwent seizure at a load of 750 pounds. In contrast, seizure conditions for the samples of the dioctyl sebacate containing the compounds of the present invention were from 1250 to 1500 pounds. In addition, the oils after the evaluations in Runs No. 2, 3 and 6 were clear. Only slight darkening occurred in the oil after evaluation in Run No. 3.

*Example XV*

Another series of evaluations were made in the same manner described in Example XIV, except that the lubricating oil was a mineral oil marketed commercially by oil to which had been added two percent by weight of the addition reaction product of Example V.

TABLE II

| Run No. | Temperature, °F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temp., °F. |
| 7 | 172 | 350–S | | 5–6 | 30–S | | 0 | S | | 425 | <0.1 | 275 |
| 8 | 150 | 234 | 340 | 5–6 | 12–13 | 18–21 | 0 | 0 | 12 | 1,250 | 0.3 | 450 |
| 9 | 170 | 261 | 335 | 6–7 | 12–14 | 15–20 | 0 | 0 | 11 | 1,225 | <0.1 | 413 |
| 10 | 178 | 248 | 340 | 6–7 | 11–14 | 17–21 | 0 | 0 | 9 | 1,250 | 0.15 | 413 |
| 11 | 180 | 273 | 355 | 7 | 14–15 | 19–22 | 0 | 0 | 16 | 1,250 | 0.2 | 450 |
| 12 | 147 | 248 | 337 | 3–5 | 12–13 | 15–19 | 0 | 0 | 9 | 1,250 | 1.4 | 435 |

S—Seizure.

Here again, it will be seen that the oil without additive (Run No. 7) underwent seizure at a small load which, in this case, was 425 pounds. In contrast, the white oil containing the additive of the present invention did not undergo seizure until loads of from 1225 to 1250 pounds.

*Example XVI*

The addition reaction product of di-(oxyethylenated nonylphenol)-dithiophosphate and the ester of the amine-epichlorohydrin condensation product, prepared as described in Example VII, also was evaluated in the Falex machine described in Example XIV. However, the synthetic lubricating oil used in this example was pentaerythritol ester marketed commercially as "Hercules 164."

When evaluated in this manner, the "Hercules J64" oil without additive had a seizure load of 1000 pounds. A sample of the same oil containing two percent by weight of the additive, prepared as described in Example VII, had a seizure load of 1250 pounds.

*Example XVII*

The addition reaction product, prepared as described in Example VI, is used in a concentration of 0.5% by weight as an additive in grease. The additive is incorporated in a commercial Mid-Continent lubricating oil having an S.A.E. viscosity of 20. Approximately 92% of the lubricating oil then is mixed with approximately 8% by weight of lithium stearate. The mixture is heated to about 450° F., with constant agitation. Subsequently, the grease is cooled, while agitating, to approximately 248° F., and then the grease is further cooled slowly to room temperature.

The stability of the grease is tested in accordance with ASTM D-942 method, in which method a sample of the grease is placed in a bomb and maintained at a temperature of 248° F. Oxygen is charged to the bomb, and the time required for a drop of five pounds pressure is taken as the Induction Period. A sample of the grease without additive will reach the Induction Period in about eight hours. On the other hand, a sample of the grease containing 0.3% by weight of the additive of the present invention will not reach the Induction Period for more than 100 hours.

I claim as my invention:

1. Addition reaction product of compound A selected from the group consisting of oxyalkylenated hydroxyhydrocarbon phosphate and oxyalkylenated hydroxyhydrocarbon thiophosphate and compound B being a polymeric reaction product containing basic nitrogen and consisting of the condensation product of
    compound (1) being an alkylene polyamine containing at least 3 nitrogen atoms and from 4 to 50 carbon atoms, or an alkanolamine containing at least 2 nitrogen atoms and at least one hydroxyl group and from 4 to 50 carbon atoms, or an alkanolamine containing at least one nitrogen atom and at least 2 hydroxyl groups and from 4 to 50 carbon atoms with
    compound (2) being an aliphatic or carbocyclic polycarboxylic acid consisting of carbon, hydrogen and oxygen, or corresponding anhydride, or ester thereof; said compound B being formed by the reaction, at a temperature of from about 175° F. to about 500° F., of one mole proportion of compound (2) with from one to two mole proportions of compound (1).

2. The addition reaction product of claim 1 wherein compound A is oxyalkylenated alkylphenol phosphate.

3. The addition reaction product of claim 2 wherein said oxyalkylenated alkylphenol phosphate is di-(oxyethylenated alkylphenol)-phosphate.

4. The addition reaction product of claim 1 wherein compound A is oxyalkylenated alkylphenol thiophosphate.

5. The addition reaction product of claim 4 wherein said oxyalkylenated alkylphenol thiophosphate is di-(oxyethylenated alkylphenol)-thiophosphate.

6. The addition reaction product of claim 1 wherein compound A is oxyalkylenated aliphatic alcohol phosphate.

7. The addition reaction product of claim 1 wherein compound A is oxyalkylenated aliphatic alcohol thiophosphate.

8. The addition reaction product of claim 1 wherein compound (1) is an alkylene polyamine containing at least 3 nitrogen atoms and from 6 to 50 carbon atoms, at least one of the nitrogen atoms having attached thereto an aliphatic substituent containing from 1 to 20 carbon atoms.

9. The addition reaction product of claim 1 wherein compound (1) is an aminoalkyl alkanolamine containing 2 nitrogen atoms and one hydroxyl group and from 6 to 50 carbon atoms.

10. The addition reaction product of claim 1 wherein compound (1) is N-aliphatic-dialkanolamine containing one nitrogen atom and 2 hydroxyl groups, the aliphatic group attached to the nitrogen atom containing from 1 to 50 carbon atoms and the alkanol groups containing from 2 to 20 carbon atoms each.

11. The addition reaction product of claim 1 wherein compound (2) is a polyglycol substituted linear polyester of a dibasic acid and a diol, said polyester having a total molecular weight of at least 5000.

References Cited
UNITED STATES PATENTS

| | | | |
|---|---|---|---|
| 3,002,014 | 9/1961 | Dinsmore et al. | 260—461 |
| 3,133,787 | 5/1964 | Kelley | 21—2.7 |
| 3,169,923 | 2/1965 | Guarnaccio et al. | 252—32.5 |
| 3,217,018 | 11/1965 | Pollitzer | 260—404.5 |
| 3,294,816 | 12/1966 | Latos et al. | 260—326 |

CHARLES B. PARKER, *Primary Examiner.*

B. BILLIAN, *Assistant Examiner.*